United States Patent [19]

Lehmann

[11] 3,994,524

[45] Nov. 30, 1976

[54] CONTROL LINKAGE FOR FOLDABLE TOP MOTOR VEHICLES

[75] Inventor: Adolf Lehmann, Schonaich, Germany

[73] Assignee: Daimler-Benz Aktiengesellschaft, Germany

[22] Filed: May 30, 1974

[21] Appl. No.: 474,813

[30] Foreign Application Priority Data

May 30, 1973 Germany............................ 2327486

[52] U.S. Cl.................................. 296/107; 296/116
[51] Int. Cl.².......................................... B60J 7/12
[58] Field of Search ........... 296/116, 107, 108, 121, 296/124

[56] References Cited
UNITED STATES PATENTS

| | | | |
|---|---|---|---|
| 1,448,981 | 3/1923 | Summerscales..................... | 296/107 |
| 1,809,505 | 6/1931 | Campbell........................... | 296/107 |
| 2,997,337 | 8/1961 | Day et al. ......................... | 296/107 |
| 3,047,332 | 7/1962 | Carpenter.......................... | 296/116 |

*Primary Examiner*—Robert J. Spar
*Assistant Examiner*—Winston H. Douglas
*Attorney, Agent, or Firm*—Craig & Antonelli

[57] ABSTRACT

A control of a linkage for a foldable top of motor vehicles which is pivotally mounted at brackets arranged in recesses; the linkage, in the folded-together condition of the roof is accommodated in a closed off top compartment; in the course of its unfolding operation, a roof column which begins to erect itself, displaces a curved fabric-retaining bar forming the rear termination of the top upwardly by way of an entrainment mechanism; the entrainment mechanism which is formed in the manner of a quadrilateral joint system consisting of guide members, a lever, a guide lever and fabric-retaining member, is movably supported at the bracket by way of the lever and the guide lever; a connecting lever thereby pivotally connects the quadrilateral joint system at the free end of the roof column.

18 Claims, 6 Drawing Figures

CONTROL LINKAGE FOR FOLDABLE TOP MOTOR VEHICLES

The present invention relates to a control mechanism for a linkage of a foldable top of motor vehicles, pivotally connected at brackets arranged recessed, which in the folded-together condition is accommodated within a closed-off top compartment and in which in the course of the unfolding operation, a roof column that is erected, displaces a curved fabric-retaining member forming the rearward termination of the roof in the upward direction.

Such controls are disclosed in the German Pat. Nos. 1,505,743 and 1,810,365. In both cases, it is to be prevented by special, costly measures that the curved fabric-retaining member can fall back prematurely into the top compartment. Whereas in the German Pat. No. 1,505,743, the curved fabric-retaining bar or member is released by the control system already with a far-reachingly raised top, the German Pat. No. 1,810,365 proposes to prevent by an additional blocking claw that the curved fabric retaining bar enables pivoting back of the top before its complete pivoting-up. Both prior art controls possess a complicated construction and presuppose for the actuation of the foldable top an accurate knowledge of the necessary manipulations.

It is therefore the aim of the present invention to provide a control for the linkage of a foldable top which does not entail the described shortcomings and drawbacks, and which in particular enables a cost-saving and spacesaving construction. Furthermore, a simple handling and manipulation is to be assured thereby so that also persons who are not familiar with the vehicle, are in a position to rapidly open up or close the top without the presence of the danger of damage to any parts.

Accordingly, a control of a linkage for a foldable top of motor vehicles which is pivotally connected at brackets arranged recessed is proposed which in the folded-together condition is accommodated within a closed-off top compartment and in which, in the course of the unfolding operation, an erecting roof column displaces a curved fabric-retaining bar or member forming the rearward termination of the roof upwardly by an entrainment mechanism, whereby according to the present invention, the entrainment mechanism is constituted by an operative association, combined into a type of quadrilateral joint system, consisting of guide members, lever, guide lever and the curved fabric retaining member, movably supported at the roof bracket by way of the one lever and the guide lever, and whereby the operative association may be pivotally connected by means of a connecting lever at the free end of the roof column. A positive control is provided thereby which precludes a false actuation of the foldable top.

An approximately parallel displacement of the curved fabric-retaining member in the course of the displacement can be achieved if one of the corner points of the quadrilateral joint linkage which is formed by the two guide members, moves along a circular arc during the pivotal movement of the guide members as a result of the coupling effect of the pivotally connected lever.

A tilting movement of the curved fabric retaining bar to facilitate extension and retraction out of or into the opened top compartment is made possible if the lower guide member extends downwardly angularly bent at its preferably cranked end pivotally connected with the curved fabric retaining member.

The curved fabric retaining member can be further tilted up for purposes of opening and closing the top compartment lid if the lower guide member is displaceably guided within an elongated aperture at its connecting place with the lever and with the other guide member.

In a preferred embodiment of the present invention, an angle-shaped extension projects from the narrow rear side of each bracket, against which a corner support pivotally secured at a main guide member is able to come into abutment with a folded-together foldable top.

According to a further feature of the present invention, an inwardly pointing lug is secured at the roof column respectively in proximity of its pivot point, against which comes into abutment the main guide member pivotally supported at the bracket. Furthermore, a buffer or bumper of elastic material projects from the lug, which with a non-opened top compartment lid prevents a folding back of the foldable top by abutment against the same.

Accordingly, it is an object of the present invention to provide a control for the linkage of a foldable top of motor vehicles which avoids by simple means the aforementioned shortcomings and drawbacks encountered in the prior art.

Another object of the present invention resides in a control system for a linkage of a foldable top of motor vehicles which eliminates the need for a complete knowledge of the roof actuation to enable opening and closing of the foldable top.

A further object of the present invention resides in a control for the linkage of a foldable top of motor vehicles which is pivotally connected at brackets arranged recessed, and which avoids complicated and costly constructions.

A still further object of the present invention resides in a control linkage for a foldable top of motor vehicles which enables a cost-saving and space-saving construction, ensuring at the same time a simple handling to permit a rapid opening and closing of the top also by persons not familiar with the motor vehicle.

Still another object of the present invention resides in a control linkage for foldable tops of motor vehicles which practically precludes a false actuation of the foldable top.

These and other objects, features and advantages of the present invention will become more apparent from the following description when taken in connection with the accompanying drawing which shows, for purposes of illustration only, one embodiment in accordance with the present invention and wherein.

Figure 1:
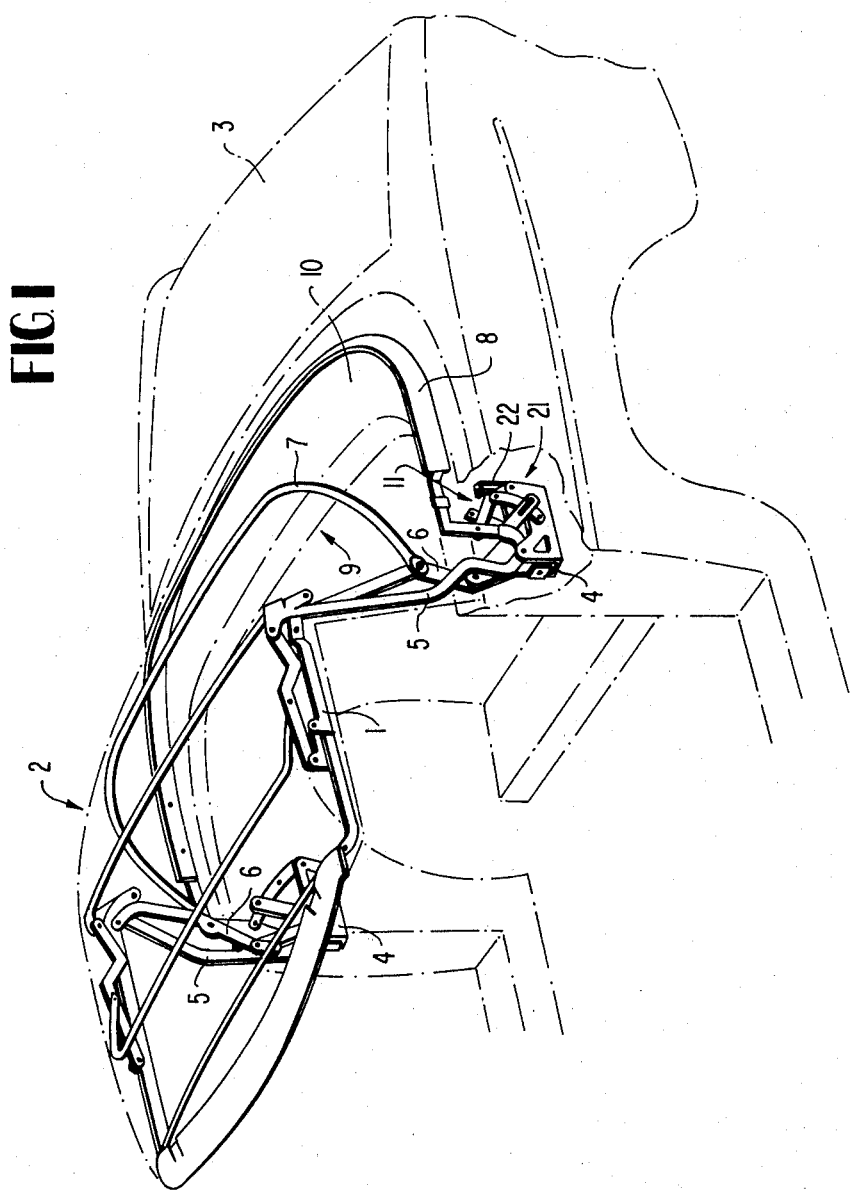
FIG. 1 is a perspective view of a control linkage of a foldable top of a passenger motor vehicle in accordance with the present invention, showing the various parts in the folded-up or raised-up position.
Figure 5:
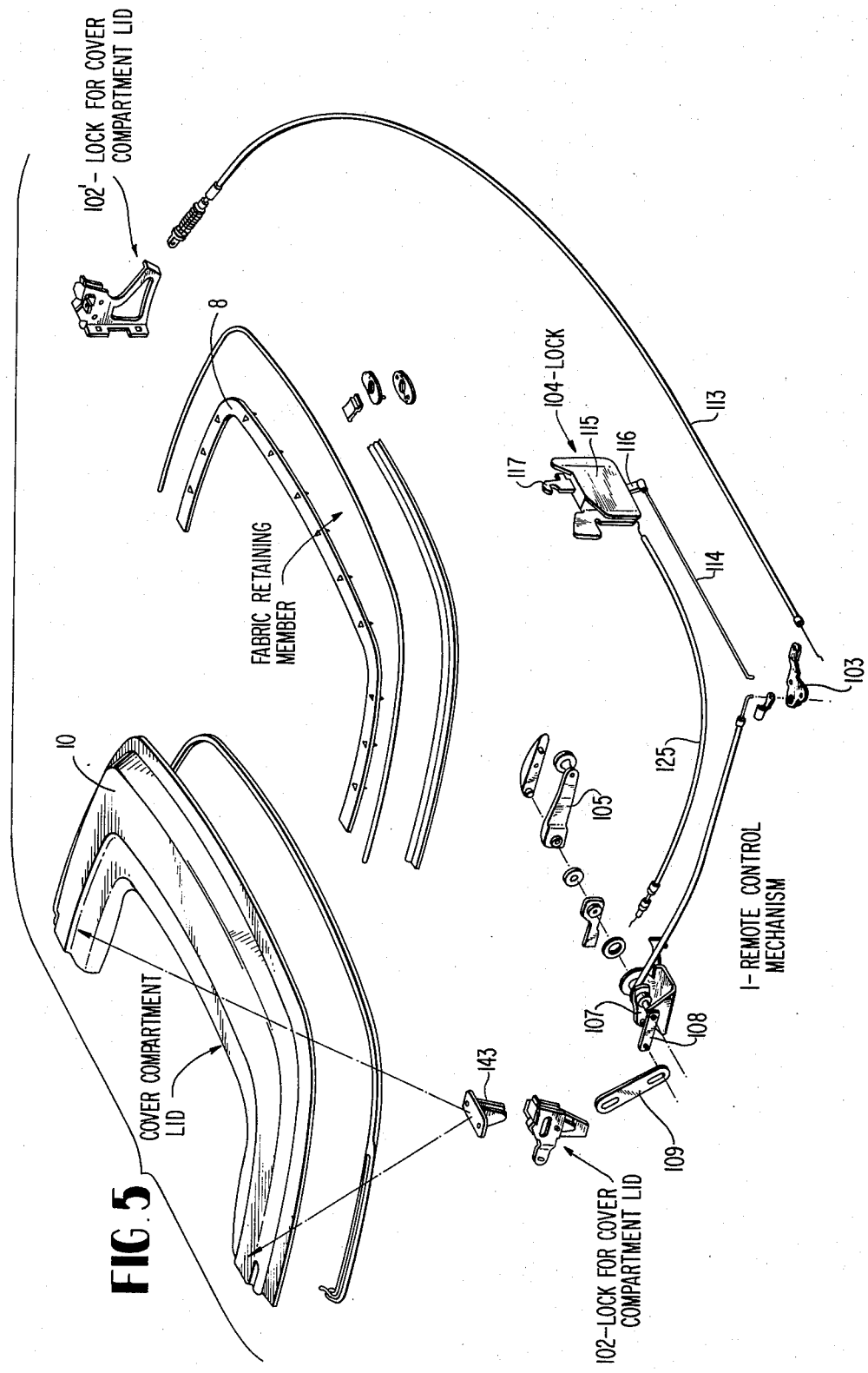
FIG. 5 is an exploded view of a remote control locking mechanism which may be used with the control linkage for a foldable top according to the present invention.

Referring now to the drawing wherein like reference numerals are used throughout the various views to designate like parts and more particularly to FIG. 1, reference numeral 1 designates a linkage of an unfolded or raised-up foldable top generally designated by reference numeral 2 whose cover fabric has been omitted for the sake of clarity. Two mutually oppositely disposed brackets 4 which are arranged recessed in the vehicle body 3 indicated in dash and dot lines, serve as support for a roof column 5 and a main guide member 6, at which a corner support 7 is adapted to be pivotally secured. A curved fabric-retaining member or bar 8 forming the rearward termination of the foldable top 2, which with an unfolded or raised-up top 2, rests on a top compartment lid 10 closing off in the upward direction a top compartment 9 (FIG. 1) and which is tensioned by a control and locking mechanism of any conventional construction, such as disclosed in my U.S. application Ser. No. 474,811, filed on even date herewith now U.S. Pat. No. 3,891,252 and corresponding to the German patent application No. P 23 27 487.5, the subject matter of which is incorporated herein by reference, is operatively connected with the roof column 5 by way of an entrainment mechanism generally designated by reference numeral 11. FIG. 5 shows in exploded view the overall arrangement of such control and locking mechanism as described in the aforementioned patent application.

The entrainment mechanism 11 is formed by an operative association combined in the manner of a quadrilateral joint system and consisting of guide members 12 and 13, of a lever 14, of a guide lever 15 and of the curved fabric-retaining member 8; this operative association is pivotally connected at the bracket 4 by means of the lever 14 and the guide lever 15 and at the free end 17 of the roof column 5 by means of a connecting lever 16.

Figure 2:
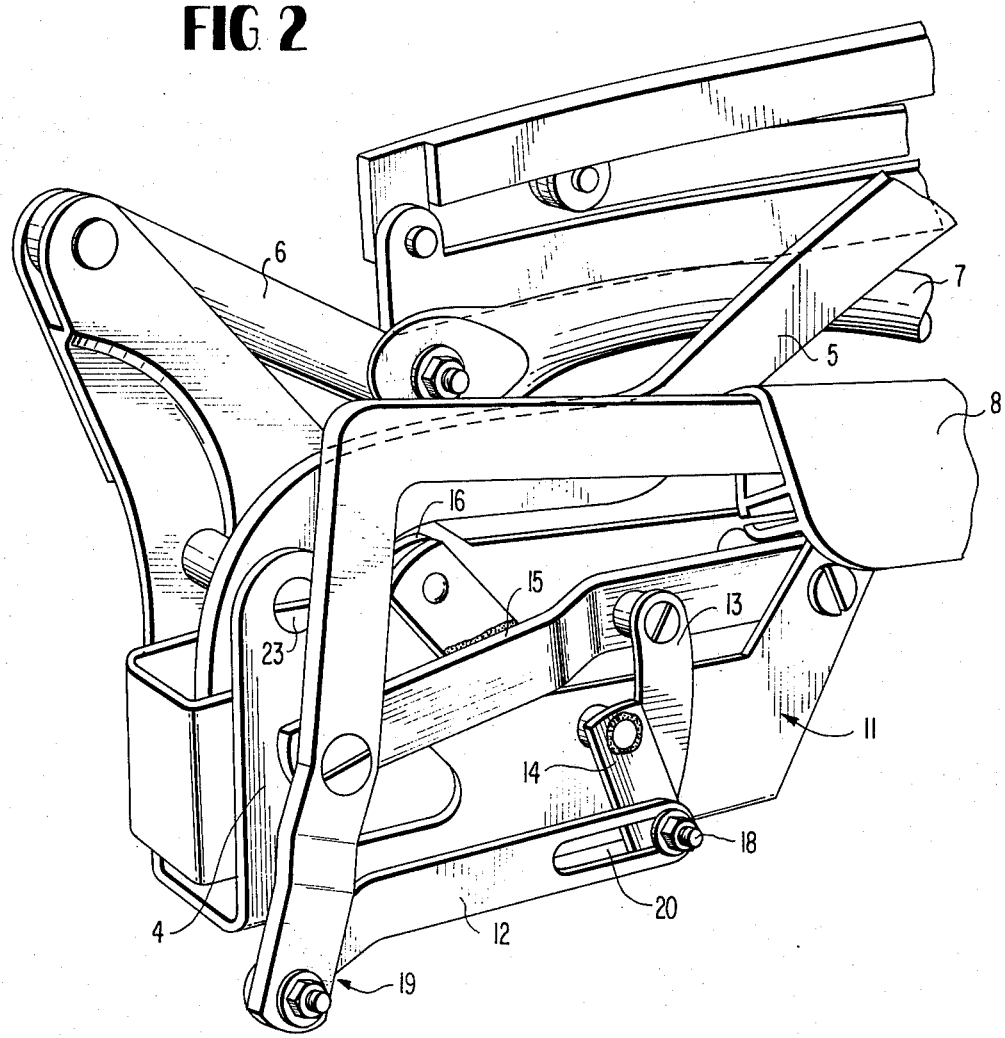
FIG. 2 is a partial perspective view, on an enlarged scale, illustrating the control linkage of the foldable top in accordance with the present invention in the folded-together position.
Figure 3:
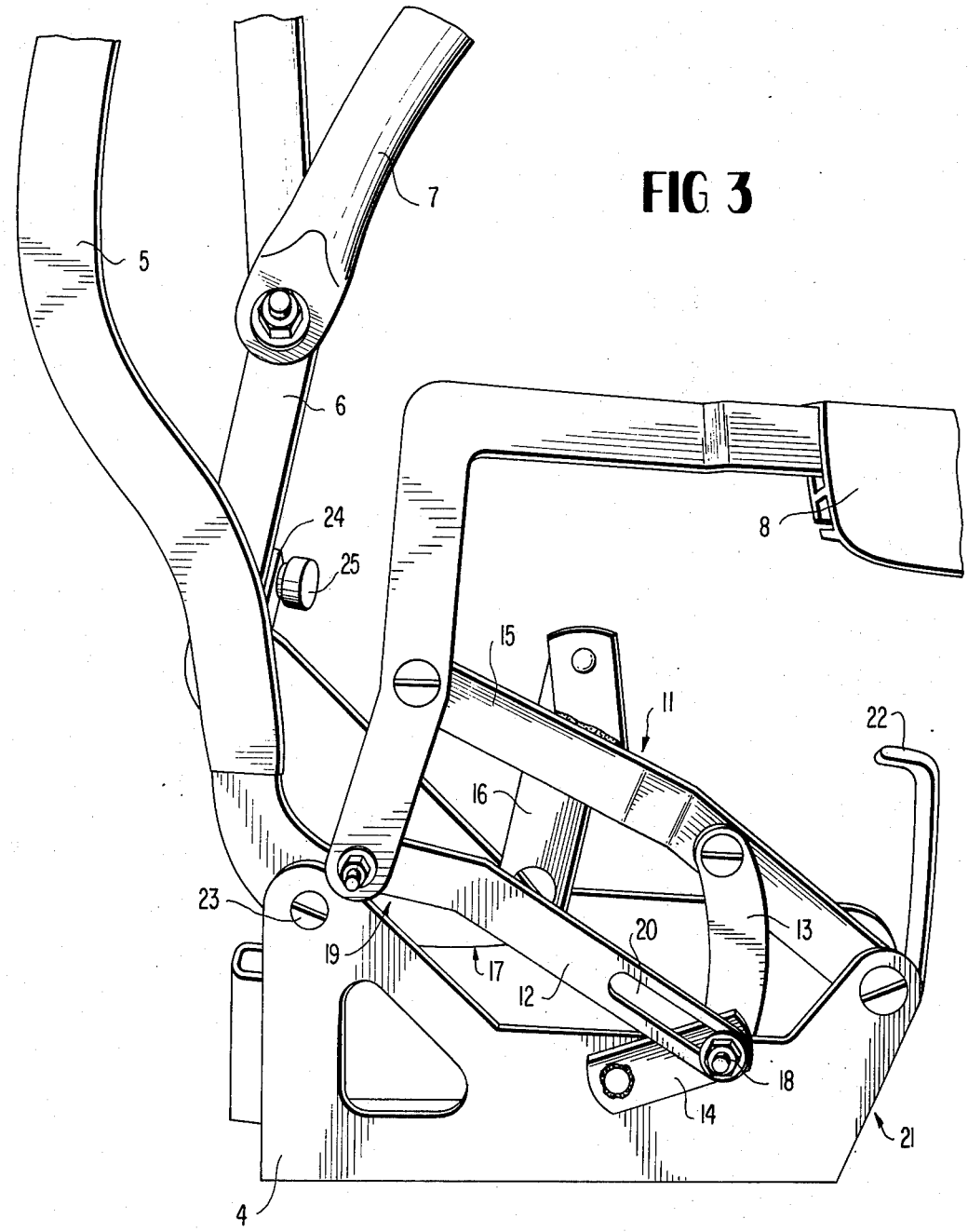
FIG. 3 is a partial side elevational view of the control linkage illustrating the various parts in the unfolded position.

In order that an approximately parallel transfer of the curved fabric-retaining member 8 from the folded-together position of the foldable top 2 illustrated in FIG. 2 into the unfolded or raised-up position illustrated in FIG. 3 takes place, a corner point 18 of the quadrilateral joint system formed by the two guide members 12 and 13 moves along a circular arc owing to the coupling effect of the pivotally connected lever 14. The guide member 12 is angularly bent in the downward direction at its end 19 which is constructed offset or cranked and is pivotally connected with the fabric-retaining member 8, whereby the fabric-retaining member 8 carries out a tilting movement, by means of which both the lowering operation of the curved fabric-retaining member 8 into the top compartment 9 as also the extending or raising operation out of the top compartment 9 is considerably facilitated.

Figure 4:
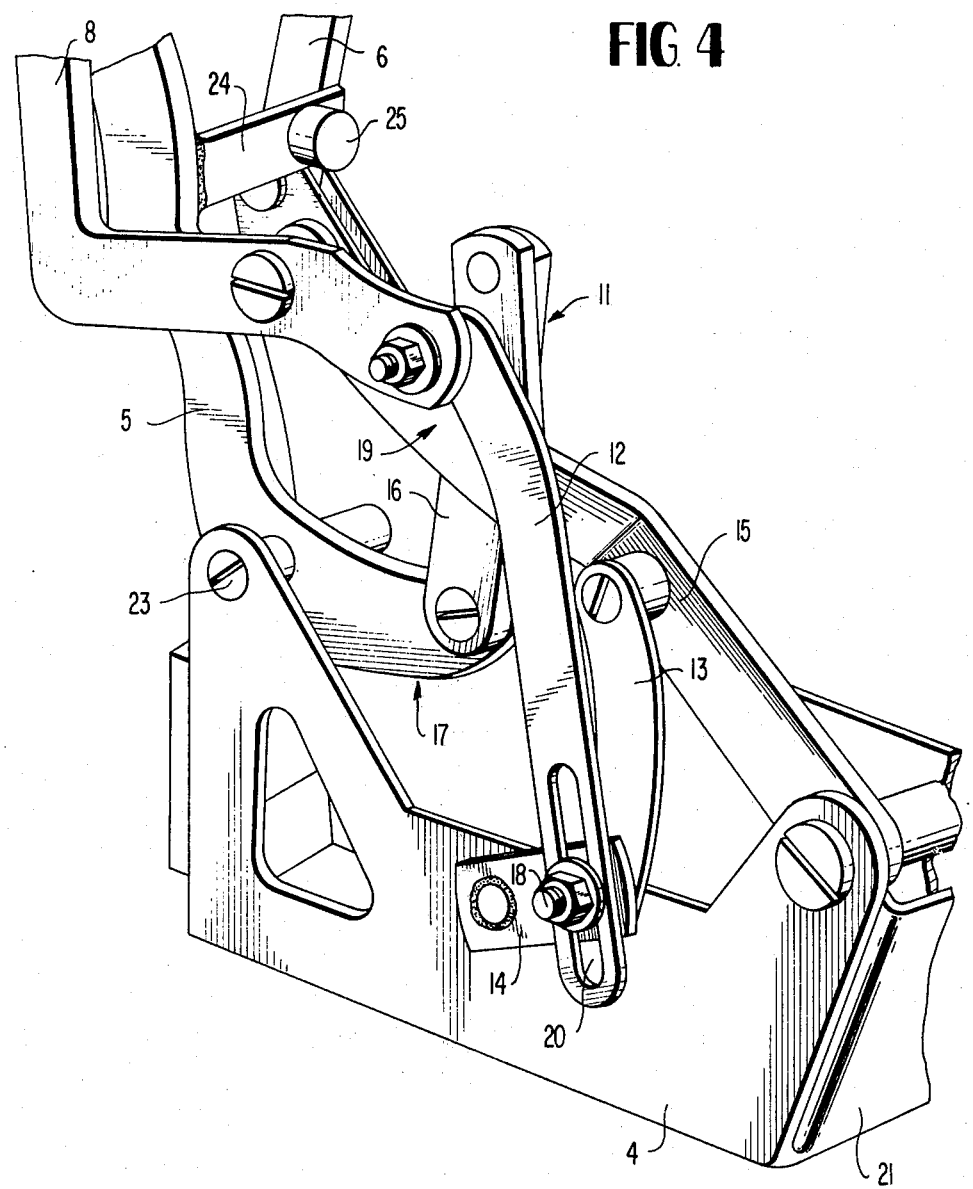
FIG. 4 is a partial perspective view of the control linkage of the foldable top in accordance with the present invention and illustrating the various parts in another position thereof.

In order to enable a displacement of the fabric-retaining member 8 to the position illustrated in FIG. 4, which is required for example, for opening and closing the top compartment lid 10 (FIG. 1) with an extended or raised curved fabric-retaining member 8, the lower guide member 12 is provided with a guidance formed by an elongated aperture 20.

Figure 6:
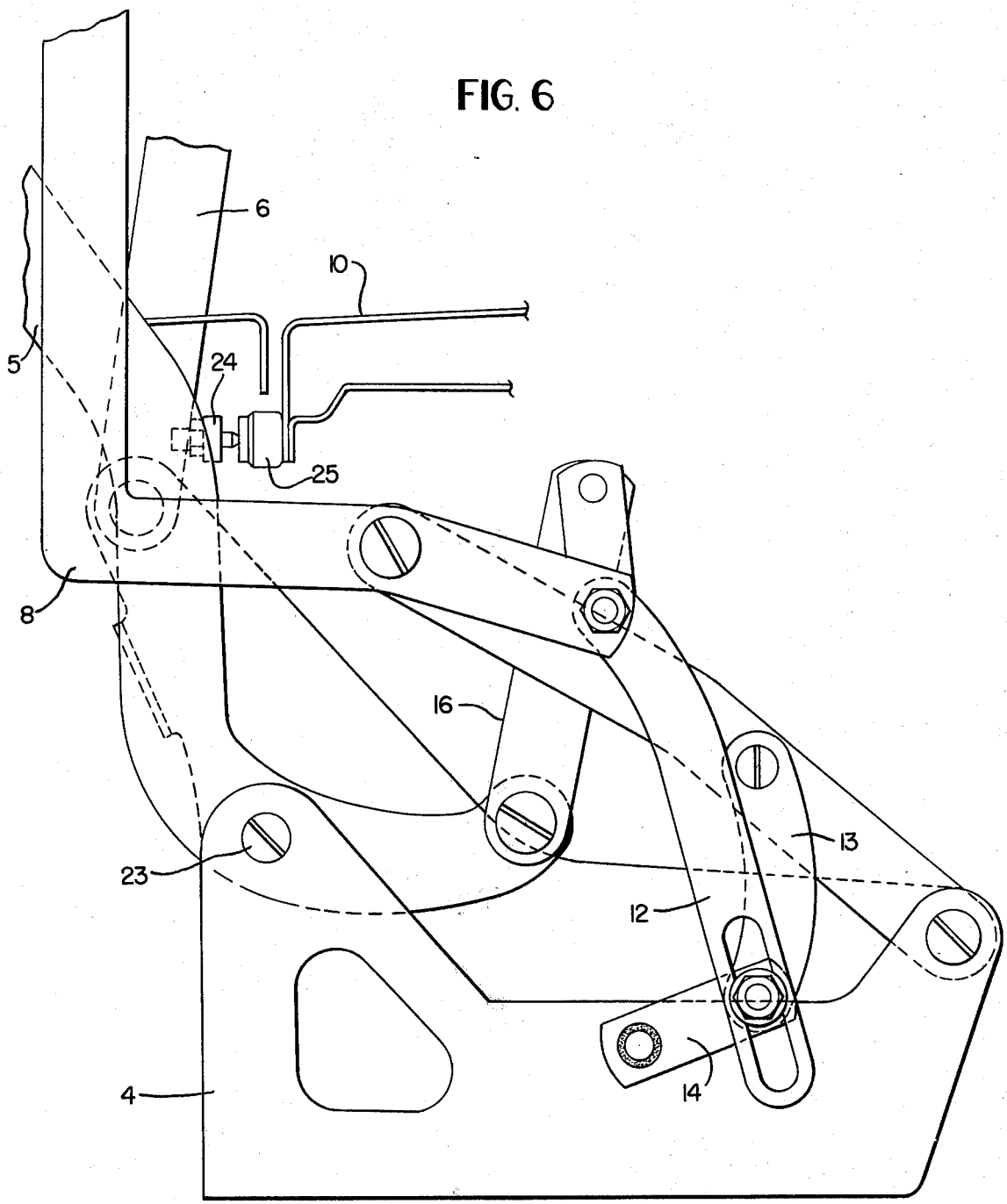
FIG. 6 is a partial side elevational view of the control linkage illustrating an arrangement for preventing a folding back of the foldable top into the top compartment in accordance with the present invention.

An extension 22 projecting upwardly angularly shaped from the narrow side 21 of each bracket 4, illustrated in FIGS. 1 and 3, serves as abutment for the corner support 7 not shown in detail and normally covered by the roof covering. Furthermore, an inwardly pointing lug 24 is secured at the roof column 5 in proximity of its pivot point 23, against which the main guide member 6 is able to come into abutment. Additionally, a buffer or pad 25 of elastic material is mounted at the lug 24, which with an unfolded foldable top 2 abuts at the closed top compartment lid 10 in a manner illustrated in FIG. 6. It is effectively prevented thereby that the foldable top 2 can be forced back before the top compartment 10 is opened.

A typical opening and closing operation for the control linkage in accordance with the present invention in connection with a foldable top is as follows:

The foldable top and control linkage are in the folded-together condition (FIG. 2) within the top cover compartment and are closed off against the outside by the top compartment lid 10. By actuation of the remote control installation shown in FIG. 5, and more particularly by actuation of the crank 105 thereof, the locks 102 and 102' for the cover compartment lid 10 are opened and the lid can then be tilted up. Thereafter, the control linkage is displaced into the position illustrated in FIG. 3 whereby the fabric-retaining member 8 carries out the tilting movement mentioned hereinabove.

The raised-up top is now secured at the upper windshield frame (not shown) and the fabric-retaining member 8 is dispaced into the upward position shown in FIG. 4 which permits a closing of the cover compartment lid 10. Thereafter, the fabric-retaining member 8 is again lowered and is engaged in the latching lever 117 (FIG. 5). By a corresponding actuation of the remote-control installation shown in FIG. 5, the latching lever 117 can now be pulled in the downward direction whereby the cover fabric of the top is pulled taut.

By the actuation of the remote control installation illustrated in FIG. 5, at first the fabric-retaining member 8 is released during the upward stroke of the latching lever 117 whereupon the fabric-retaining member 8 slightly moves upwardly. Thereafter, the locks 102 and 102' (FIG. 5) are released by way of the remote control installation. The fabric-retaining member 8 is then brought into the position according to FIG. 4 and the cover compartment lid 10 is pivoted up. The top, after the disengagement of the anchoring means at the upper windshield frame, can now be brought in one movement into the folded position according to FIG. 2 so that in the end, the top together with the linkage lies within the cover compartment. The cover compartment lid 10 can now be closed.

Of course, the control linkage of the present invention for a foldable top is not limited in its application to the remote control installation illustrated in FIG. 5. Quite to the contrary, the control linkage carrying out the actuation of the foldable top in accordance with the present invention can also be used with any other suitable arrangement as known in the prior art and/or as used in the prior art convertible motor vehicles.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A control mechanism for a foldable top of motor vehicles, which includes linkage means pivotally connected at bracket means and accommodated in the folded-together condition of the top within a top compartment means, an entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes a first guide means pivotally connected to a free end of the fabric retaining means, a second guide means pivotally connected to said first guide means guide lever means pivotally connected to said second guide means, the bracket means, and the fabric retaining means, means for pivotally supporting said quadrilateral joint system at the bracket means including a lever means having one end pivotally mounted on the bracket means and the other end pivotally connected to said first and second guide means, and connecting lever means for pivotally connecting said quadrilateral joint system at a free end of the roof column means.

2. A control mechanism according to claim 1, characterized in that the bracket means are arranged recessed.

3. A control mechanism according to claim 2, characterized in that the top compartment means is adapted to be closed off by a lid.

4. A control mechanism according to claim 3, characterized in that the fabric retaining means is a curved bar.

5. A control mechanism according to claim 1, characterized in that a corner of the quadrilateral joint system formed by said first and said second guide means moves along a circular path during the pivot movement of the guide means as a result of the coupling between said first and said second guide means and said lever means.

6. A control mechanism according to claim 5, characterized in that first guide means extends angularly bent in the downward direction from its end which is pivotally connected with the fabric retaining means.

7. A control mechanism according to claim 6, characterized in that said end is off set such that the angularly bent end lies in a plane spaced from a plane in which the remaining portion of said first guide means is disposed.

8. A control mechanism for a foldable top of motor vehicles, which includes linkage means pivotally connected at bracket means and accommodated in the folded-together condition of the top within a top compartment means, an entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes a first and second guide means, lever means, guide lever means and the fabric retaining means, one end of said first guide means being pivotally connected with the fabric retaining means, the other end of said first guide means being pivotally connected with said second guide means and said lever means so as to form a corner of the quadrilateral joint system, said quadrilateral joint system being pivotally supported at the bracket means by way of the lever means and the guide lever means, a connecting lever means is provided for pivotally connecting said quadrilateral joint system at a free end of the roof column means, the corner of the quadrilateral joint system formed by said first and said second guide means and the lever means moves along a circular path during the pivot movement of the guide means as a result of the coupling effect of the lever means with said first and second guide means, said first guide means extends angularly bent in a downward direction from its end which is pivotally connected with the fabric retaining means, and in that said first guide means is displaceably guided in an elongated aperture at its connecting place with the lever means and with said second guide means.

9. A control mechanism for a foldable top of motor vehicles, which includes linkage means pivotally connected at bracket means and accommodated in the folded together condition of the top within a top compartment means, and entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes a first and a second guide means, lever means, guide lever means and the fabric retaining means, said first and said second guide means and said lever means forms a corner of the quadrilateral joint system, said quadrilateral joint system being pivotally supported at the bracket means by way of the lever means and the guide lever means, and said quadrilateral joint system being pivotally connected at a free end of the roof column means by way of a connecting lever connected to said guide lever means, the corner of the quadrilateral joint system formed by said first and said second guide means and said lever means moves along a circular path during the pivot movement of the guide means as a result of the coupling effect of the lever means with said first and second guide means, the first guide means extends angularly bent in a downward direction from its end which is pivotally connected with the fabric retaining means, the first guide means is displaceably guided in an elongated aperture at its connecting place with the lever means and with the second guide means, and in that an angularly shaped extension projects upward from a rear narrow side of each bracket means, and a corner support is pivotally secured at a main guide member coming into abutment at said extension when the foldable top is folded-together.

10. A control mechanism according to claim 9, characterized in that an inwardly projecting lug means is secured to the roof column means in proximity to its pivot point, the main guide member pivotally supported at the bracket means coming into abutment at said lug means.

11. A control mechanism according to claim 10, characterized in that a buffer of elastic material projects from the lug means which with a non-opened top compartment lid, prevents a falling back of the foldable top by abutment at the lid.

12. A control mechanism according to claim 1, characterized in that the first guide means extends angularly bent in the downward direction from its end which is pivotally connected with the fabric retaining means.

13. A control mechanism according to claim 12, characterized in that said end is off set such that the angularly bent end lies in a plane spaced from a plane in which the remaining portion of said first guide means is disposed.

14. A control mechanism for a foldable top of motor vehicles, which includes linkage means pivotally connected at bracket means and accommodated in the folded-together condition of the top within a top compartment means, an entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes a first and a second guide means, lever means, guide lever means and the fabric retaining means, said quadrilateral joint system being pivotally supported at the bracket means by way of the lever means and the guide lever means, a connecting lever means is provided for pivotally connecting said quadrilateral joint system at a free end of the roof column, and in that said first guide means is displaceably guided in an elongated aperture at a pivotal connection with said lever means and with said second guide means.

15. A control mechanism for a foldable top of motor vehicles, which includes linkage means pivotally connected at bracket means and accommodated in the folded-together condition of the top within a top compartment means, an entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes guide means, lever means, guide lever means and the fabric retaining means, said quadrilateral joint system being pivotally supported at the bracket means by way of the lever means and the guide lever means, and said quadrilateral joint system being pivotally connected at a free end of the roof column by way of a connecting lever, and in that an angularly shaped extension projects upward from the rear narrow side of each bracket means, a corner support pivotally secured at a main guide member coming into abutment at said extension when the foldable top is folded-together.

16. A control mechanism for a foldable top of motor vehicles, which includes linkage means pivotally connected at bracket means and accommodated in the folded-together condition of the top within a top compartment means, an entrainment means and a roof column means which is erected in the course of the unfolding operation and which displaces upwardly a fabric retaining means forming the rear termination of the top by way of said entrainment means, characterized in that the entrainment means is constituted by an operative association combined in the manner of a quadrilateral joint system which includes guide means, lever means, guide lever means and the fabric retaining means, said quadrilateral joint system being pivotally supported at the bracket means by way of the lever means and the guide lever means, and said quadrilateral joint system being pivotally connected at a free end of the roof column means by way of a connecting lever, and in that an inwardly projecting lug means is secured at the roof column means in proximity to its pivot point, a main guide member pivotally supported at the bracket means coming into abutment at said lug means.

17. A control mechanism according to claim 16, characterized in that a buffer of elastic material projects from the lug means which with a non-opened top compartment lid, prevents a falling back of the foldable top by abutment at the lid.

18. A control mechanism according to claim 16, characterized in that an angularly shaped extension projects upward from the rear narrow side of each bracket means, a corner support pivotally secured at a main guide member coming into abutment at said extension when the foldable top is folded-together.

* * * * *